(12) United States Patent
Partamian et al.

(10) Patent No.: US 7,062,755 B2
(45) Date of Patent: Jun. 13, 2006

(54) RECOVERING FROM COMPILATION ERRORS IN A DYNAMIC COMPILATION ENVIRONMENT

(75) Inventors: Noubar Partamian, Mountain View, CA (US); Laurent Morichetti, San Jose, CA (US); Amitabh Nene, Santa Clara, CA (US); Andrew Trick, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 10/272,960

(22) Filed: Oct. 16, 2002

(65) Prior Publication Data

US 2004/0078687 A1 Apr. 22, 2004

(51) Int. Cl.
G06F 9/44 (2006.01)
G06F 9/45 (2006.01)
G06F 11/00 (2006.01)

(52) U.S. Cl. .................. 717/124; 717/140; 717/141; 717/126; 714/38

(58) Field of Classification Search ........ 717/140–145, 717/162, 124, 126; 714/100, 1, 25, 38, 2
See application file for complete search history.

(56) References Cited

U.S. PATENT DOCUMENTS

| | | | | |
|---|---|---|---|---|
| 5,182,806 A | * | 1/1993 | McKeeman et al. | 717/145 |
| 5,325,533 A | * | 6/1994 | McInerney et al. | 717/107 |
| 5,386,570 A | * | 1/1995 | Lindhorst | 717/146 |
| 5,487,147 A | * | 1/1996 | Brisson | 714/1 |
| 5,560,015 A | * | 9/1996 | Onodera | 717/143 |
| 5,761,513 A | * | 6/1998 | Yellin et al. | 717/127 |
| 5,768,593 A | * | 6/1998 | Walters et al. | 717/141 |
| 5,854,929 A | * | 12/1998 | Van Praet et al. | 717/156 |
| 5,956,479 A | * | 9/1999 | McInerney et al. | 714/38 |
| 6,078,744 A | * | 6/2000 | Wolczko et al. | 717/153 |
| 6,158,045 A | * | 12/2000 | You | 717/124 |
| 6,275,986 B1 | * | 8/2001 | Ewart | 717/126 |
| 6,298,481 B1 | * | 10/2001 | Kosaka et al. | 717/110 |
| 6,327,701 B1 | * | 12/2001 | Ungar | 717/125 |
| 6,519,571 B1 | * | 2/2003 | Guheen et al. | 705/14 |
| 6,526,572 B1 | * | 2/2003 | Brauch et al. | 717/154 |
| 6,641,532 B1 | * | 11/2003 | Iliff | 600/300 |
| 6,654,953 B1 | * | 11/2003 | Beaumont et al. | 717/158 |

(Continued)

OTHER PUBLICATIONS

Title: Error Repair in Shift-Reduce Parser, author: Mckenzie et al, ACM, Jul. 1995.*

(Continued)

Primary Examiner—Chameli C. Das
(74) Attorney, Agent, or Firm—Tuan V. Ngo

(57) ABSTRACT

Techniques are provided for recovering from compilation errors in environments that use dynamic compilers. Application programs include Java bytecodes, and compilation includes sequential invocation of separate compilation phases on a region of bytecodes. If compilation of a region results in a fatal error, then the compiler identifies the "failed" phase. If the failed phase is a non-essential phase, then the compiler attempts to re-compile the region after skipping the failed phase. However, if the failed phase is essential, then the compiler attempts to replace that failed phase with a simpler version. Nevertheless, if the fatal error cannot be avoided or the compiler is unable to replace the failed phase with a simpler version, then the compiler prevents compilation of the code encompassing the fatal error in future attempts.

21 Claims, 5 Drawing Sheets

U.S. PATENT DOCUMENTS

| | | | |
|---|---|---|---|
| 6,681,387 B1 * | 1/2004 | Hwu et al. | 717/158 |
| 6,691,301 B1 * | 2/2004 | Bowen | 717/114 |
| 6,721,943 B1 * | 4/2004 | Krishnaiyer et al. | 717/150 |
| 6,760,905 B1 * | 7/2004 | Hostetter et al. | 717/148 |
| 6,873,290 B1 * | 3/2005 | Anderson et al. | 342/457 |
| 6,886,114 B1 * | 4/2005 | Parry | 714/48 |

OTHER PUBLICATIONS

Title: A VHDL Error Simulator for Functional Test Generation, author: Fin et al, ACM, 2000.*

Title: Generation of Interactive Parsers with Error handling, author: Steegmans et al, IEEE, 1992.*

* cited by examiner

RECOVERING FROM COMPILATION ERRORS IN A DYNAMIC COMPILATION ENVIRONMENT

FIELD OF THE INVENTION

The present invention relates generally to compiling programs and, more specifically, to recovering from compilation errors in a dynamic compilation environment.

BACKGROUND OF THE INVENTION

A Virtual Machine is software used by many programming platforms to execute application programs. Dynamic compilers are commonly used within Virtual Machines to speed up program execution. Generally, programmers convert applications written in a programming language for such platform, to a stream of bytecodes. Such bytecodes can be run on any computer that has a Virtual Machine installed on it. The Virtual Machine reads the bytecode stream and invokes an Interpreter to execute the bytecodes sequentially. The Virtual Machine then identifies regions of bytecodes whose execution is performance-critical and invokes the dynamic compiler to compile such regions into code that represents a faster version of the supplied region. Compiled code is not interpreted, but directly executed by the computer's underlying processor. The Interpreter transfers control to the compiled code for subsequent execution of such regions, greatly boosting overall execution performance.

Sometimes, the dynamic compiler can crash while compiling a region of bytecode. Because the compiler works alongside the Virtual Machine, a fatal error in the compiler can cause the Virtual Machine to crash as well, terminating the execution of the application. One solution to this problem is, after the application crashes, identifying all error-prone regions of bytecodes, and excluding compilation attempts of such regions in subsequent runs. However, creating such exclusion lists is often manual and hence inefficient, and completely excluding compilation of such regions in subsequent runs may lead to significant performance degradation, since the regions will now be executed by the Interpreter.

Base on the foregoing, it is desirable that mechanisms be provided to solve the above deficiencies and related problems.

SUMMARY OF THE INVENTION

The present invention, in various embodiments, provides techniques for recovering from compilation errors in environments that use dynamic compilers. In one embodiment, the environment includes application programs written in the JAVA programming language, a JAVA Virtual Machine that drives the execution of the programs, and a dynamic compiler arranged into a plurality of compilation phases. Each phase implements a specific compiler optimization that contributes towards the total performance of the compiled code. In effect, compilation includes sequential invocation of separate compilation phases on a region of bytecodes. If compilation of a particular region results in a fatal error, then the compiler identifies the compilation phase that generated the error, which is referred to as the "failed" phase, and, depending on classification of the failed phase, the compiler takes appropriate actions. If the failed phase is a non-essential phase, then the compiler attempts to re-compile the region while skipping the failed phase. However, if the failed phase is essential for compilation and/or contributes significantly towards the performance of the compiled code, then the compiler attempts to replace that failed phase with a simpler version. Nevertheless, if the fatal error cannot be avoided or the compiler is unable to replace the failed phase with a simpler version, then the compiler prevents all future compilation attempts for the code region that caused the fatal error in the compiler.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purpose of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

System Overview

Figure 1:
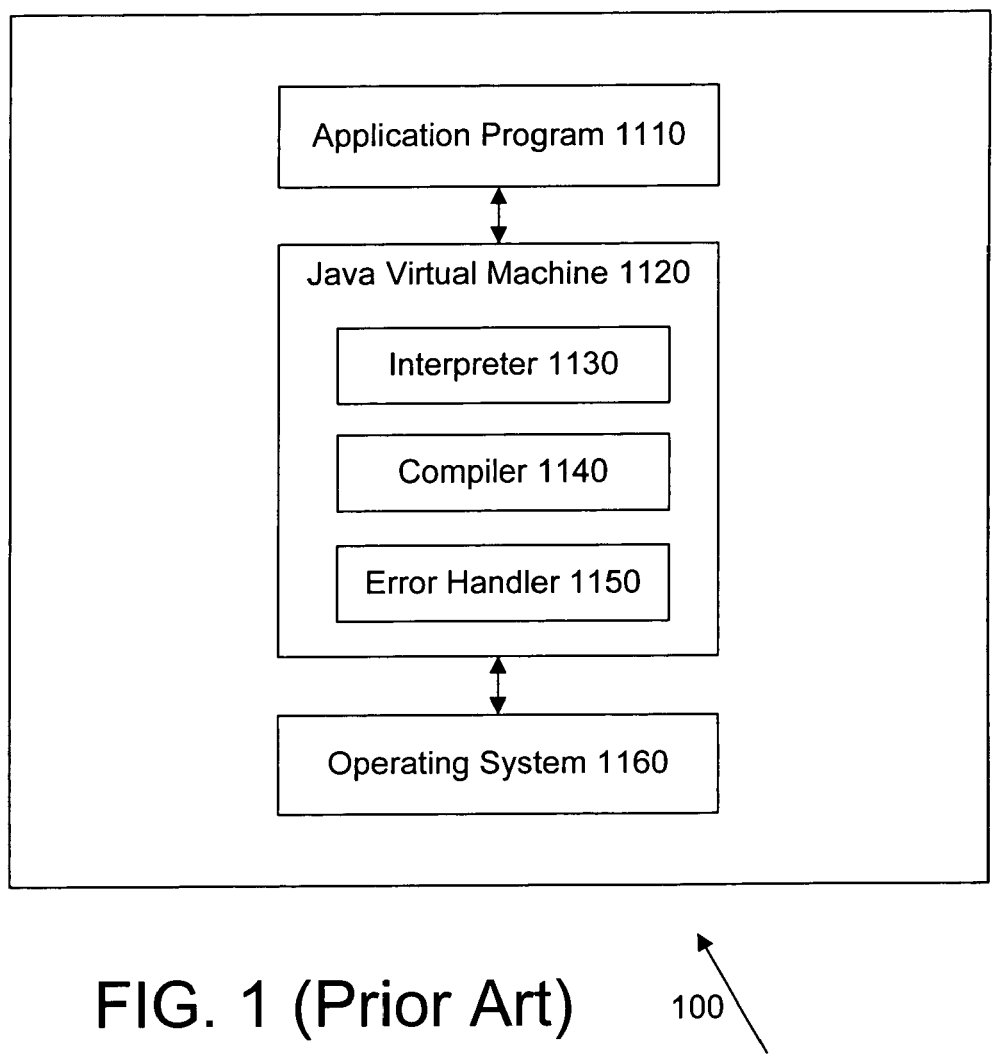
FIG. 1 shows a server upon which embodiments of the invention may be implemented.

FIG. 1 shows a server 100 upon which embodiments of the invention may be implemented. Server 100 runs various application programs one of which is shown as a program 1110. In one embodiment, program 1110 is written in the JAVA language and is run within a JAVA Runtime Environment (JRE) that includes a JAVA Virtual Machine (JVM) 1120 having an interpreter 1130, a compiler 1140, and an error handler 1150. Generally, JVM 1120 is implemented in software running on the hardware and operating system 1160 of server 100. JVM 1120 thus provides an environment allowing a generic program representation in the form of bytecodes to be executed on server 100. JVM 1120 is also responsible for optimizing the JAVA program and translating the JAVA bytecodes into machine instructions directly executable by server 100. Typically, program 1110 is optimized and executed under the control of JVM 1120. Program 1110 in turn provides services to users potentially over a network such as a communication link, the Internet, etc.

In general, interpreter 1130, together with JVM 1120, executes the generic program representation of bytecodes on server 100. In parallel with bytecodes interpretation and when appropriate, compiler 1140 compiles performance-critical regions of code in application program 1110, and places the compiled code into a code cache. Typically, a region of code is qualified as performance critical if it is invoked a number of times passing a predefined threshold. As performance-critical regions of code are invoked quite often and are executed in the compiled form, instead of in the interpreted form, overall execution performance of application program 1110 improves. This is because the compiled regions of code perform the same action of the original region using a smaller number of machine instructions. As a result, compilation may be referred to as optimization. Interpreter 1130, when executing a region of code, executes the compiled version of the region if this version exists. During execution, compiler 1140 may recompile the compiled region to further optimize it.

A process is a unit of control that executes a program, e.g., application program 1110, interpreter 1130, compiler 1140, error handler 1150, etc. A process may have one or a plurality of threads. Threads in the same process share information using memory, atomic instructions, mutexes, semaphores, etc., while processes share information using file system, sockets, shared memory, semaphores, dynamic data exchange, etc. Compiler 1140 may operate in the same or different process as JVM 1120. In one embodiment, JVM 1120's process monitors compiler 1140's process and transfers controls to error handler 1150 if compiler 1140's process crashes before producing a result. Compiler 1140 may also operate in a different computing system than that of application program 1110 and JVM 1120. In this situation, upon detecting an error, compiler 1140 uses a network protocol to notify JVM 1120 of the error. Network protocols are mechanisms by which programs executing on different computing systems share information, and, include, for example, local network area (LAN) protocols, wireless protocols, and other network protocols available in the art.

Error handler 1150 is responsible for identifying the compiler phase that generated a compiler error, deciding whether or not to exclude the phase, replacing the phase, preventing compilation of the region being compiled, etc.

Operating system 1160, commonly found in computer systems, provides a software platform on top of which application program 1110, JVM 1120, interpreter 1130, compiler 1140, error handler 1150, and other programs run.

A procedure is a logical unit of software functionality that processes input and produces output. Commonly, a procedure that initiates compilation of program 1110 is referred to as an initiating procedure, and, for illustration purposes, is referred to as an initiating procedure I. Depending on embodiments, initiating procedure I may reside within an execution engine such as JVM 1120 (not shown), or within compiler 1140. Initiating procedure I also detects errors generated by the compiler phases, transfers control to error handler 1150 upon detecting an error.

Code Regions

Figure 2A:
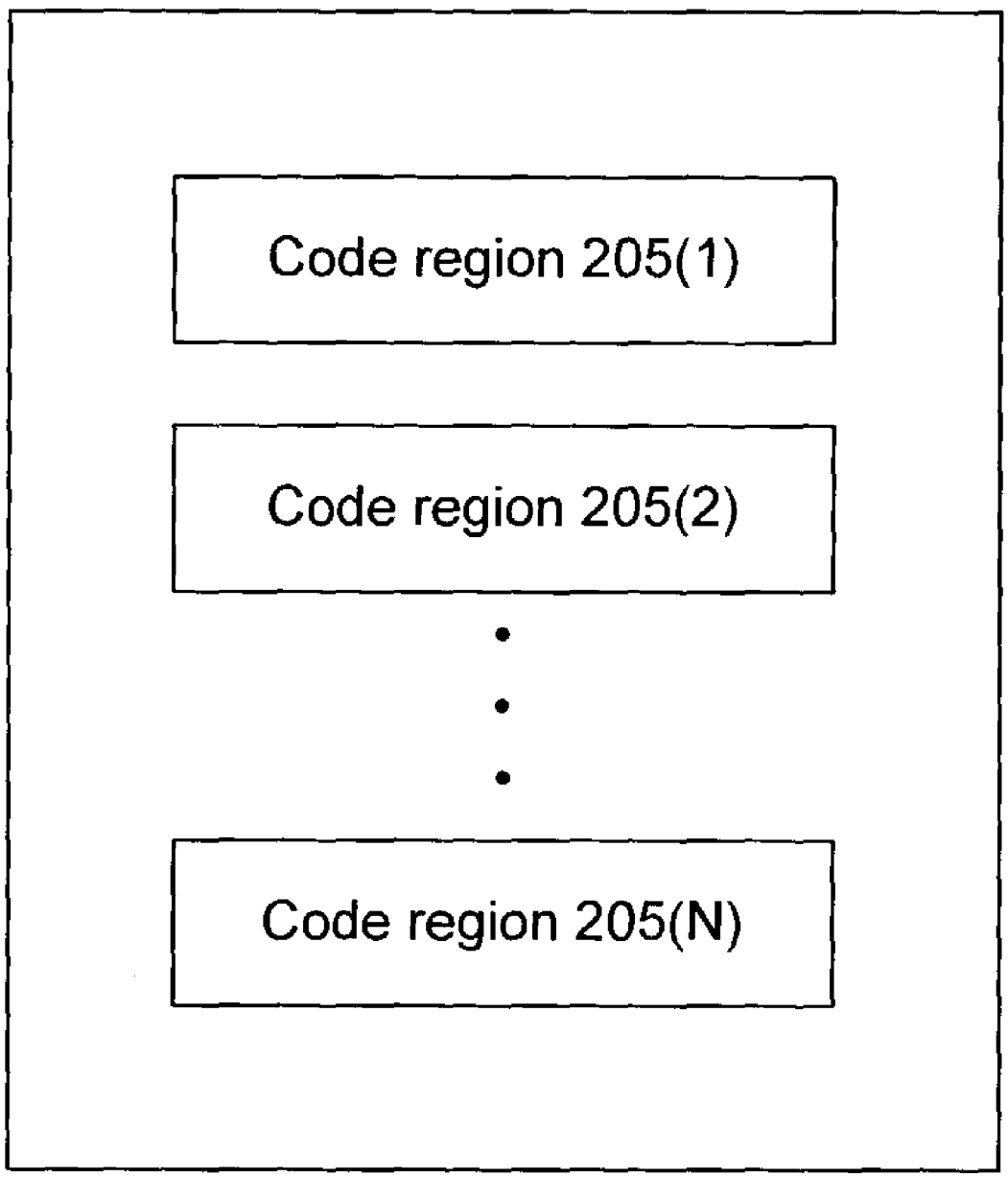
FIG. 2A shows an embodiment of an application program arranged into a plurality of code regions.

FIG. 2A shows an embodiment of application program 1110 arranged into a plurality of code regions 205(1), 205(2), . . . , 205(N). In one embodiment, while interpreter 1130 interprets program 1110, interpreter 1130 interprets code regions 205 and collects information to determine whether a code region 205, e.g., code region 205(K), is performance critical and thus should be compiled to improve performance of this code region 205(K), and of application program 1110 as a whole. In determining if code region 205(K) is performance critical, interpreter 1130 considers various factors such as the number of times code region 205(K) has been invoked in program 110, the size of code region 205(K). If code region 205(K) is worth compiling, then compiler 1140 is invoked to optimize this code region. In the meantime, interpreter 1130 continues interpreting various code regions 205 in program 1110 including code region 205(K) that is being compiled. In general, compiler 1140 accepts a code region 205 as input and produces a transformed code region as output. Since compiler 1140 compiles code regions 205 while interpreter 1130 executes program 1110, compiler 1140 may be referred to as a dynamic compiler.

Compiler Phases

Figure 2B:
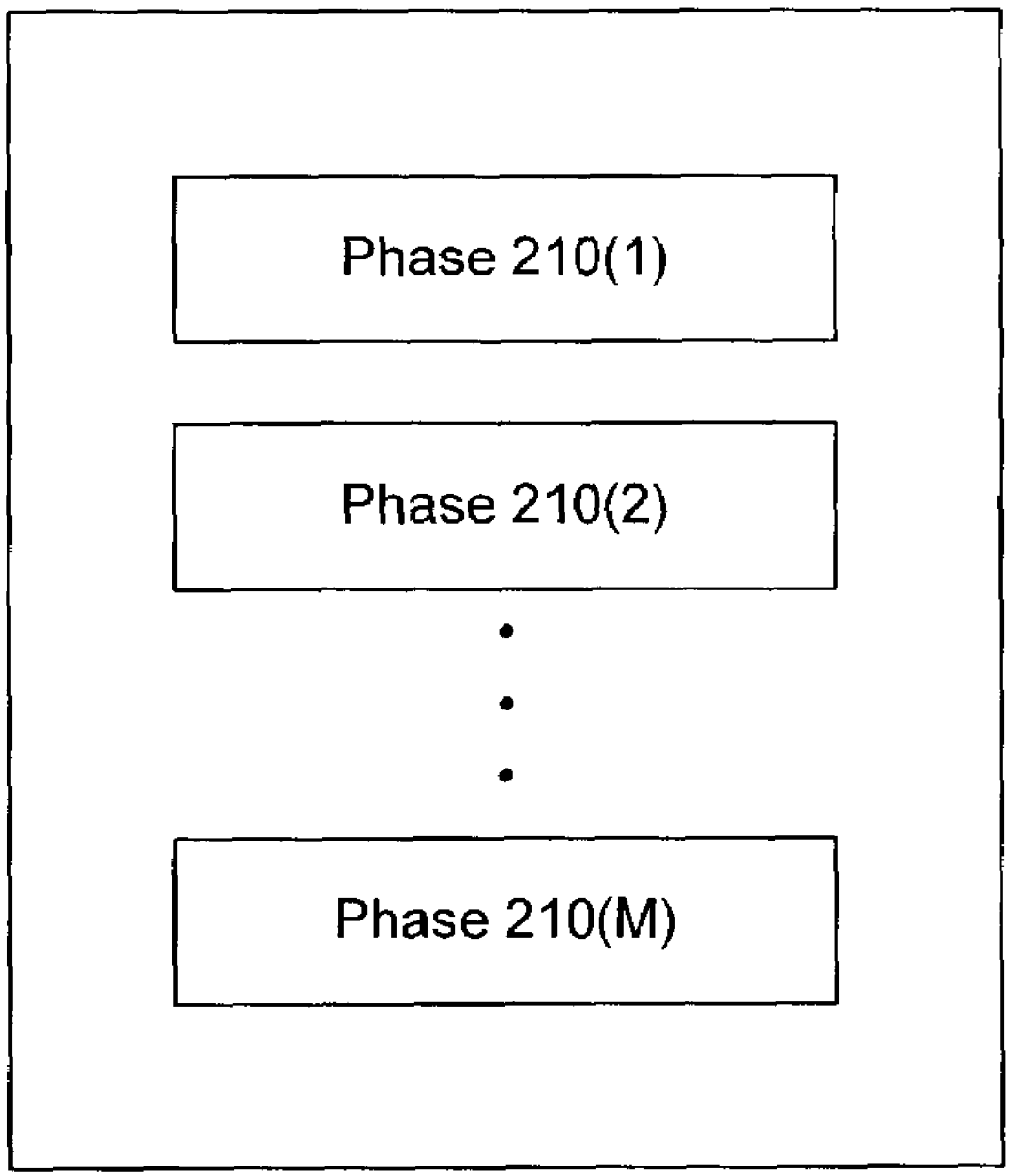
FIG. 2B shows a compiler arranged into a plurality of phases, in accordance with one embodiment.

FIG. 2B shows an embodiment of compiler 1140 arranged into a plurality of compilation phases 210(1), 210(2), . . . 210(M), each of which optimizes, to a certain extent, a code region 205 that is being compiled, and thus contributes towards the total performance of the compiled code. Examples of phase optimization include improving looping code, eliminating dead code, i.e., code that has been written but never used, eliminating NO-OP instructions, etc. Different phases 210 are loosely coupled, hence, a phase, e.g., phase 210(I+1), can be applied even if a phase 210(I) was not applied. While this loose dependence between phases 210 holds, certain phases 210 that have a considerable effect on the compilation outcome as they perform the majority of work towards producing an optimal version of the original code region may be classified as essential phases, e.g., phases 210E. A phase 210 is also classified as essential if compilation of a code region 205 may not be complete without compiling that phase 210. In one embodiment, if compilation of a code region is not complete, then the processor's specific compiled code for that region is not produced. A phase allocating registers is an example of an essential phase while a phase improving looping code, eliminating dead code, eliminating NO-OP instructions, etc, is an example of non-essential phases.

Detecting an Error

Detecting an error may be accomplished in multiple ways. Compiler 1140 may attempt to recognize potential errors early. Before entering a phase, compiler 1140 may check if the region being compiled fits a necessary set of criteria and reject those regions that do not fit the criteria by notifying initiating procedure I of the error. Additionally, while performing a phase or after a phase has completed, compiler 1140 may check the consistency of the phase's data and results. When compiler 1140 detects a problem or inconsistency, it notifies initiating procedure I of the error. If compiler 1140 is not able to detect an error early enough, the error may result in a hardware exception, which, in one embodiment, is intercepted and handled without crashing the program using such mechanisms as signal handlers or operating support for structured exception handling.

Returning Control to the Initiating Procedure

Initiating procedure I is responsible for initiating compilation of a code region, and needs to regain compilation control once an error occurs that disturbs the compilation order. To return compilation control to initiating procedure I, in one embodiment, compiler 1140 returns an error code that propagates through the chain of procedure activations until procedure I receives the error code. In an alternative embodiment, compiler 1140 directly delivers an error code and transfers control to initiating procedure I using routines that save and restore the stack state, such as setjmp and longjmp. In both embodiments, initiating procedure I recognizes the error code and invokes error handler 1150. Alternatively, compiler 1140 may use programming language support for structured exception handling in which procedure I contains an exceptions handler. Control is automatically transferred to the exception handler when an exception is raised inside compiler 1140. The exception handler notifies initiating procedure I of the error. If the error generates a hardware exception, then, in one embodiment, operating system 1160 includes support for structured exception handling which allows application program 1110 to recover from both software and hardware exceptions. The exception handler included in initiating procedure I will be activated when an operating system exception is raised inside compiler 1140. In an alternative embodiment, operating system 1160 has support for detecting hardware and software errors using signal handlers. When an error occurs inside compiler 1140, operating system 1160 raises a signal. In this embodiment, initiating procedure I also includes a signal handler that catches those signals raised during compilation.

Recovering from Compilation Errors

In one embodiment, if a fatal error occurs while applying a phase, e.g., phase 210(J) on a code region, e.g., code region 205(K), then compiler 1140 returns control to initiating procedure I and notifies it of the error. When the initiating procedure I is notified of the error, procedure I transfers control to error handler 1150. Error handler 1150 then identifies the phase from which the error originated, which, in this example, is phase 210(J), and, depending on classification of this phase 210(J), error handler 1150 takes appropriate actions. If phase 210(J) is in an essential phase, then it is referred to as essential phase 210E(J), and error handler 1150 invokes compiler 1140 on the same code region 205(K), applying a simpler version of this essential phase 210E(J). If phase 210(J) is not an essential phase, then error handler 1150 invokes compiler 1140 on the same code region 205(K), but error handler 1150 skips this compiler phase 210(J). For fatal errors that take place in parts of compiler 1140 where it is known that no recovery is possible such as when compiler 1140 produces an erroneous internal representation of code region 205(K) upon which all compiler phases operate, error handler 1150 disables all subsequent compilations of code region 205(K). In one embodiment, error handler 1150 earmarks this code region 205(K) for such disablement.

Illustration of the Steps in Compiling a Code Region

Figure 3:
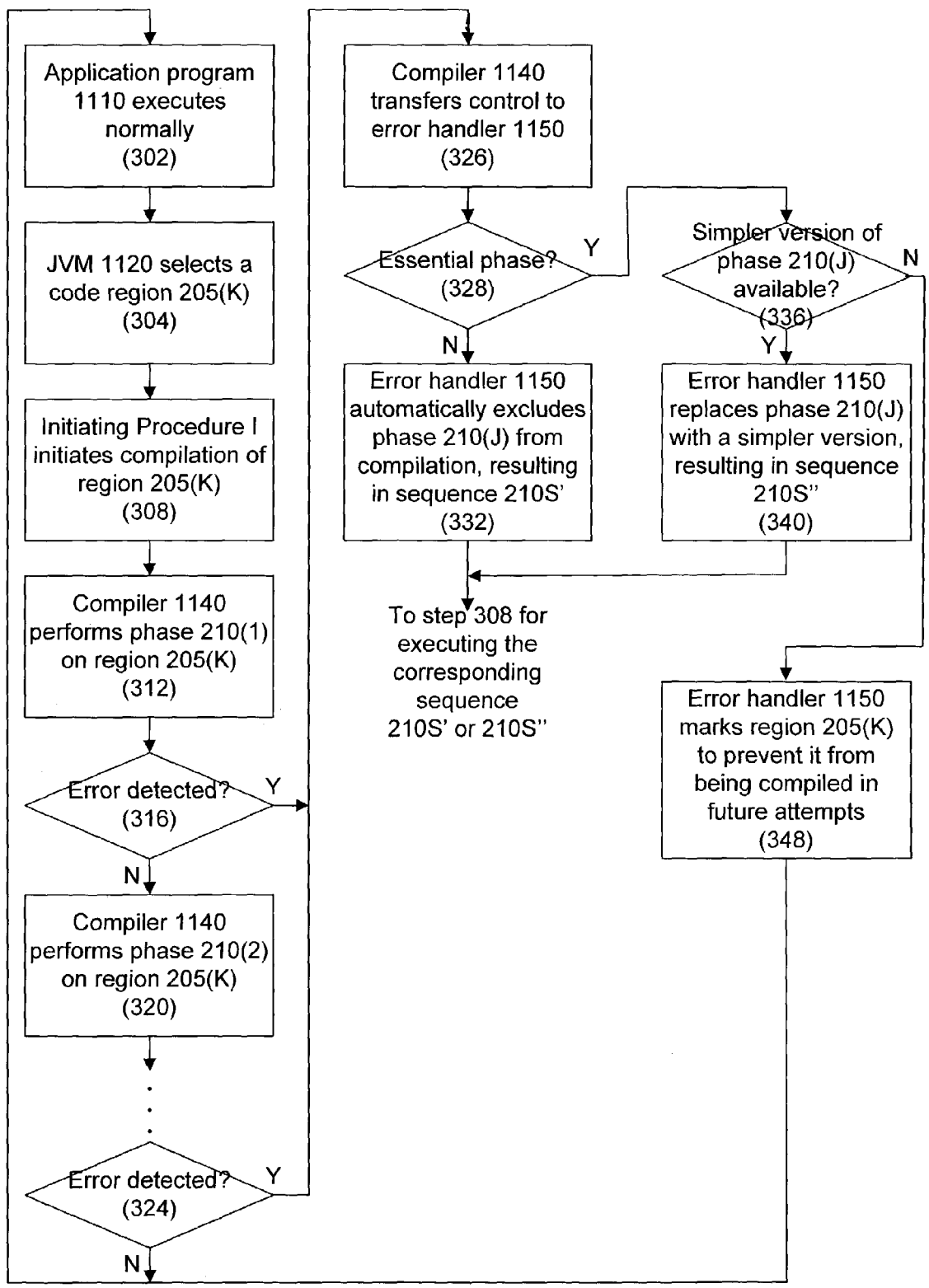
FIG. 3 is a flowchart illustrating the steps in compiling a code region, in accordance with one embodiment.

FIG. 3 is a flowchart 300 illustrating the steps in compiling a code region, e.g., code region 205(K), in accordance with one embodiment.

In step 302, application program 1110 executes normally.

In step 304, the execution engine, or, in one embodiment, JVM 1120, selects a region, e.g., region 205(K), of application program 1110.

In step 308, initiating procedure I initiates compilation of region 205(K).

In steps 312 through 324, compiler 1140 performs a sequence of compilation phases, e.g., phase 210(1) to 210(M), on region 205(K). For illustration purposes, this sequence of phases is referred to as sequence 210S. During performance of this sequence 210S, compiler 1140 checks for errors such as in steps 316 and 324. If no error occurs, then flowchart 300 returns to step 302 for compiling a different code region, e.g., code region 205(K+1).

However, for illustration purposes, in step 324, an error is detected in phase 210(J), and compiler 1140, in step 326, thus transfers control to error handler 1150. In various embodiments, this control transfer is via initiating procedure I.

In step 328, error handler 1150 determines whether the phase that generated the detected error, e.g., phase 210(J), is an essential phase. If phase 210(J) is a non-essential phase, then, in step 332, error handler 1150 automatically excludes this non-essential phase 210(J) from sequence 210S, resulting in a new sequence of phases, e.g., sequence 210S', for subsequent compilations. Consequently, in this example, sequence 210S' includes phase 210(1) to phase 210(M) without phase 210(J). The flowchart 300 then transfers to step 308 for starting sequence 210S'.

However, if, in step 328, error handler 1150 determines that phase 210(J) is an essential phase, then, in step 336 error handler 1150 determines whether or not a simpler version of phase 210(J) is available. If this simpler version is available, then, in step 340, error handler 1150 replaces phase 210(J) with this simpler version, which results in a new sequence of phases, e.g., sequence 210S", for future compilations. The flowchart 300 then transfers to step 308 for executing sequence of phases 210S".

However, if, in step 336, error handler 1150 determines that a simpler version of phase 210(J) is not available, then, in step 348, error handler 1150 marks region 205(K) to prevent the execution engine from initiating compilation of this code region 205(K) in the future. Application program 1110 then executes normally in step 302.

Computer System Overview

Figure 4:
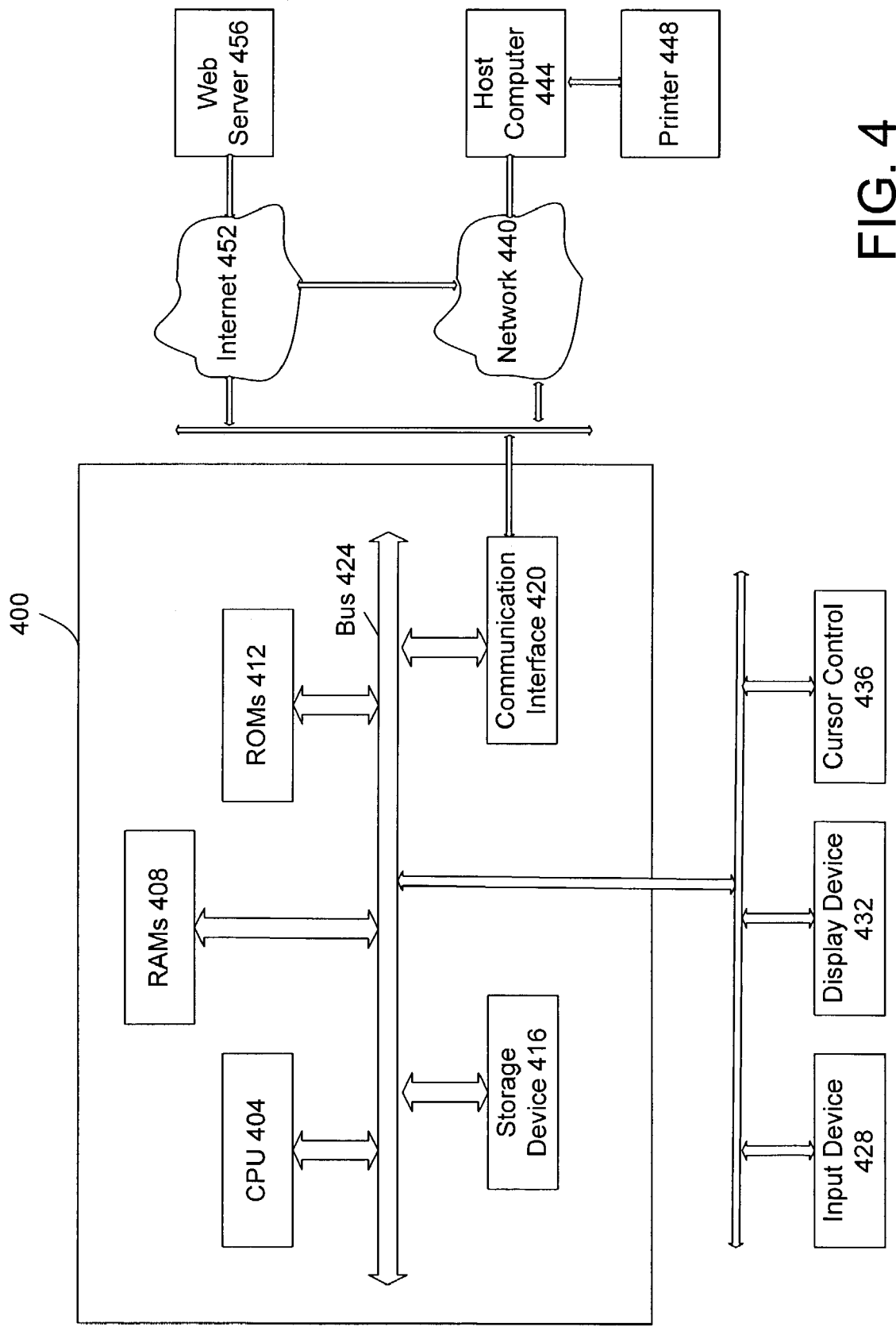
FIG. 4 shows a computer system upon which embodiments of the invention may be implemented.

FIG. 4 is a block diagram showing a computer system 400 upon which an embodiment of the invention may be implemented. For example, computer system 400 may be implemented to operate as server 100, to perform functions in accordance with the techniques described above, etc. In one embodiment, computer system 400 includes a central processing unit (CPU) 404, random access memories (RAMs) 408, read-only memories (ROMs) 412, a storage device 416, and a communication interface 420, all of which are connected to a bus 424.

CPU 404 controls logic, processes information, and coordinates activities within computer system 400. In one embodiment, CPU 404 executes instructions stored in RAMs 408 and ROMs 412, by, for example, coordinating the movement of data from input device 428 to display device 432. CPU 404 may include one or a plurality of processors.

RAMs 408, usually being referred to as main memory, temporarily store information and instructions to be executed by CPU 404. Information in RAMs 408 may be obtained from input device 428 or generated by CPU 404 as part of the algorithmic processes required by the instructions that are executed by CPU 404.

ROMs 412 store information and instructions that, once written in a ROM chip, are read-only and are not modified or removed. In one embodiment, ROMs 412 store commands for configurations and initial operations of computer system 400.

Storage device 416, such as floppy disks, disk drives, or tape drives, durably stores information for use by computer system 400.

Communication interface 420 enables computer system 400 to interface with other computers or devices. Communication interface 420 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 420 may also allow wireless communications.

Bus 424 can be any communication mechanism for communicating information for use by computer system 400. In the example of FIG. 4, bus 424 is a media for transferring data between CPU 404, RAMs 408, ROMs 412, storage device 416, communication interface 420, etc.

Computer system 400 is typically coupled to an input device 428, a display device 432, and a cursor control 436. Input device 428, such as a keyboard including alphanumeric and other keys, communicates information and commands to CPU 404. Display device 432, such as a cathode ray tube (CRT), displays information to users of computer system 400. Cursor control 436, such as a mouse, a trackball, or cursor direction keys, communicates direction information and commands to CPU 404 and controls cursor movement on display device 432.

Computer system 400 may communicate with other computers or devices through one or more networks. For example, computer system 400, using communication interface 420, communicates through a network 440 to another computer 444 connected to a printer 448, or through the world wide web 452 to a server 456. The world wide web 452 is commonly referred to as the "Internet." Alternatively, computer system 400 may access the Internet 452 via network 440.

Computer system 400 may be used to implement the techniques described above. In various embodiments, CPU 404 performs the steps of the techniques by executing instructions brought to RAMs 408. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 404 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 404 are in the form of one or more software programs and are initially stored in a CD-ROM being interfaced with computer system 400 via bus 424. Computer system 400 loads these instructions in RAMs 408, executes some instructions, and sends some instructions via communication interface 420, a modem, and a telephone line to a network, e.g. network 440, the Internet 452, etc. A remote computer, receiving data through a network cable, executes the received instructions and sends the data to computer system 400 to be stored in storage device 416.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for handling errors resulting from compiling a program while it is being executed, comprising the steps of:
   selecting a region of code among a plurality of regions of code in the program, for compilation;
   compiling the selected region of code using a first sequence of compilation phases; and
   if an error results from performing a compilation phase on the selected region of code, then using a second sequence of phases to compile the selected region of code; the second sequence of phases differs from the first sequence of phases;
   wherein, based on classification of the compilation phase, the second sequence of phases is selected by one or a combination of excluding the compilation phase from the first sequence of phases and using a simpler embodiment of the compilation phase in the second sequence of phases.

2. The method of claim 1 wherein, based on classification of the compilation phase, of:
   excludes compilation of the selected region of code in subsequent compilation attempts.

3. The method of claim 1 wherein excluding the compilation phase from the first sequence of phases is performed when the compilation phase is a non-essential phase.

4. The method of claim 1 wherein using the simpler embodiment of the compilation phase in the second sequence of phases is performed when the compilation phase is an essential phase and the simpler embodiment of the compilation phase is available.

5. The method of claim 1 wherein if the compilation phase is an essential phase and no simpler embodiment of the same phase is available, then the method further comprising halting compilation of the selected region of code and excluding compilation of the selected region in subsequent compilation attempts.

6. The method of claim 1 wherein a virtual machine works with an interpreter to execute the program.

7. The method of claim 1 wherein the program is in a form of program representation executed by a virtual machine via an interpreter and a dynamic compiler.

8. A system for handling errors resulting from compiling a program while it is being executed, comprising:
   means for selecting a region of code among a plurality of regions of code in the program, for compilation; and
   a compiler for compiling the selected region of code using a first sequence of compilation phases;
   wherein if an error results from performing a compilation phase on the selected region of code, then the compiler uses a second sequence of phases to compile the selected region of code; the second sequence of phases differs from the first sequence of phases, and, based on classification of the compilation phase, the second sequence of phases is selected by one or a combination of excluding the compilation phase from the first sequence of phases and using a simpler embodiment of the compilation phase in the second sequence of phases.

9. The system of claim 8 further comprising means for, based on classification of the compilation phase, excluding compilation of the selected region of code in subsequent compilation attempts.

10. The system of claim 8 wherein excluding the compilation phase from the first sequence of phases is performed when the compilation phase is a non-essential phase.

11. The system of claim 8 wherein using the simpler embodiment of the compilation phase in the second sequence of phases is performed when the compilation phase is an essential phase and the simpler embodiment of the compilation phase is available.

12. The system of claim 8 wherein if the compilation phase is an essential phase and no simpler embodiment of the same phase is available, then the system further comprising means for halting compilation of the selected region of code and excluding compilation of the selected region in subsequent compilation attempts.

13. The system of claim 8 further wherein a virtual machine works with an interpreter to execute the program.

14. The system of claim 8 wherein the program is in a form of program representation executed by a virtual machine via an interpreter and a dynamic compiler.

15. A computer-readable storage medium embodying instructions that perform a method for handling errors resulting from compiling a program while it is being executed, the method comprising the steps of:
- selecting a region of code among a plurality of regions of code in the program, for compilation;
- compiling the selected region of code using a first sequence of compilation phases; and
- if an error results from performing a compilation phase on the selected region of code, then using a second sequence of phases to compile the selected region of code; the second sequence of phases differs from the first sequence of phases;
- wherein, based on classification of the compilation phase, the second sequence of phases is selected by one or a combination of excluding the compilation phase from the first sequence of phases and using a simpler embodiment of the compilation phase in the second sequence of phases.

16. The computer-readable storage medium of claim 15, wherein, based on classification of the compilation phase, the method excludes compilation of the selected region of code in subsequent compilation attempts.

17. The computer-readable storage medium of claim 15 wherein excluding the compilation phase from the first sequence of phases is performed when the compilation phase is a non-essential phase.

18. The computer-readable storage medium of claim 15 wherein, using the simpler embodiment of the compilation phase in the second sequence of phases is performed when the compilation phase is an essential phase and the simpler embodiment of the compilation phase is available.

19. The computer-readable storage medium of claim 15 wherein, if the compilation phase is an essential phase and no simpler embodiment of the same phase is available, then the method further comprising halting compilation of the selected region of code and excluding compilation of the selected region in subsequent compilation attempts.

20. The computer-readable storage medium of claim 15 wherein a virtual machine works with an interpreter to execute the program.

21. The computer-readable storage medium of claim 15 wherein the program is in a form of program representation executed by a virtual machine via an interpreter and a dynamic compiler.

* * * * *

UNITED STATES PATENT AND TRADEMARK OFFICE
CERTIFICATE OF CORRECTION

| | |
|---|---|
| PATENT NO. | : 7,062,755 B2 |
| APPLICATION NO. | : 10/272960 |
| DATED | : June 13, 2006 |
| INVENTOR(S) | : Noubar Partamian et al. |

Page 1 of 1

It is certified that error appears in the above-identified patent and that said Letters Patent is hereby corrected as shown below:

In column 3, line 62, delete "110," and insert -- 1110, --, therefor.

In column 10, line 15, in Claim 18, delete "wherein," and insert -- wherein --, therefor.

Signed and Sealed this

Fourth Day of August, 2009

JOHN DOLL
*Acting Director of the United States Patent and Trademark Office*